Oct. 31, 1933.  C. C. KREBS  1,933,268
TIRE COVER
Filed Dec. 23, 1929
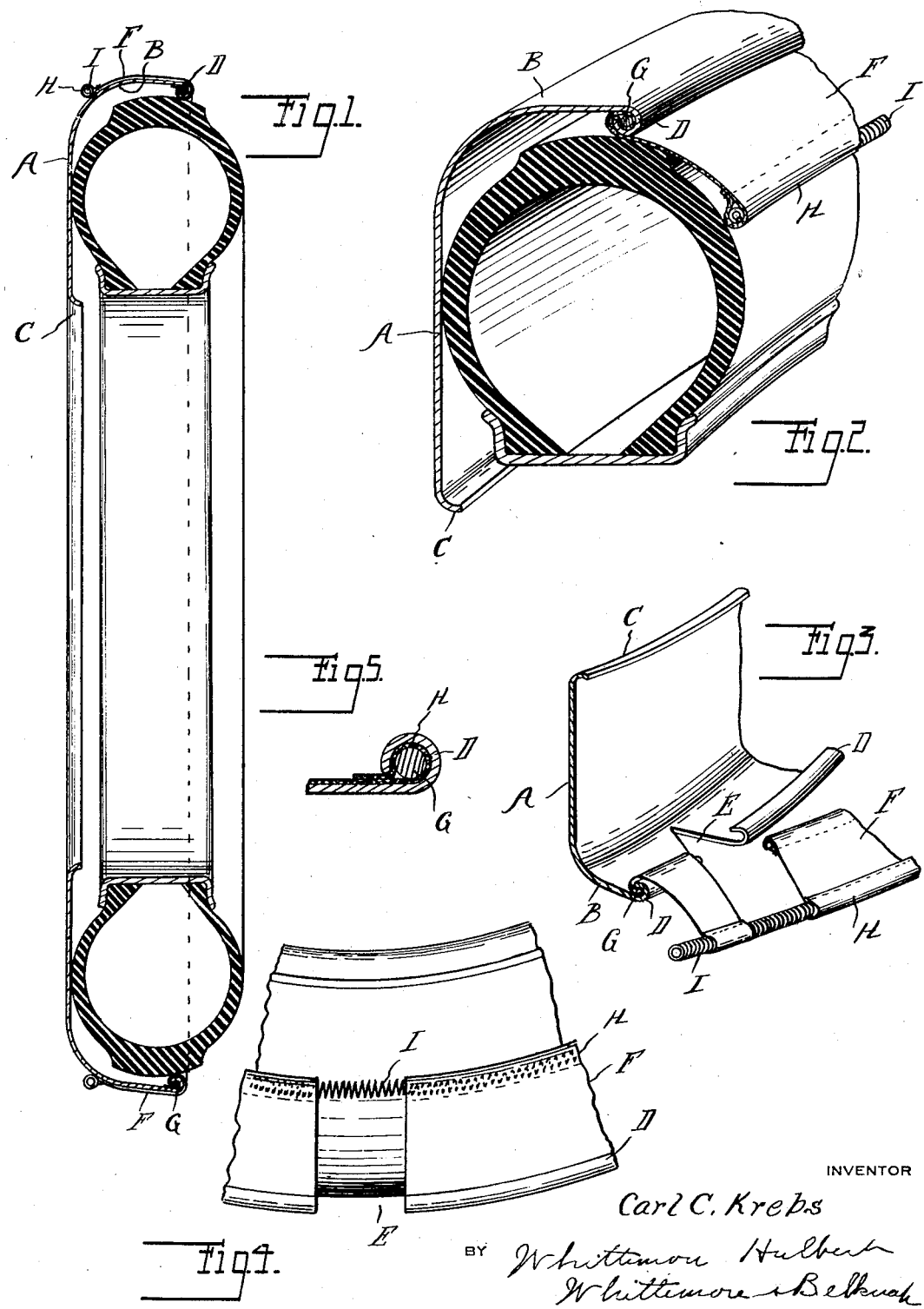
INVENTOR
Carl C. Krebs
BY Whittemore Hulbert
Whittemore & Belknap
ATTORNEYS Patented Oct. 31, 1933

1,933,268

UNITED STATES PATENT OFFICE 1,933,268

TIRE COVER

Carl C. Krebs, Detroit, Mich., assignor, by mesne assignments, to Columbus Metal Tire Cover Company, Detroit, Mich., a corporation of Michigan Application December 23, 1929
Serial No. 416,183

7 Claims. (Cl. 150—54)

The invention relates to tire covers such as are used in connection with separate tires on motor vehicles. The invention consists in the novel construction as hereinafter set forth. In the present state of the art tire covers are made of various materials such as fabric and metal. Where fabric is used it is fashioned to fit about the tire and is held in position in different ways, one being an annular spring secured to the inner edge of the inner wall. On the other hand, where the covers are made of metal it is necessary either to make these in sections or to provide clamping means for holding them in position about the tire. These metal covers may be highly finished and present a pleasing appearance but one defect is the tendency for the fastenings to loosen and to rattle.

It is the object of the present invention to retain the advantages and pleasing appearance of the metallic cover while providing improved securing means therefor and also greatly simplifying the construction and lessening the cost of manufacture. This is accomplished by combining a metal section which covers the front and a portion of the periphery of the tire with a fabric section which extends around the rear of the tire and which is provided with resilient means for holding it taut. This dispenses with the necessity of forming the metal cover in sections or of providing clamps or other metallic securing devices. It also provides a means of holding the metal part from rattling and renders it possible to apply and secure one size of cover to tires differing somewhat in dimensions.

In detail, my improved cover is preferably formed as illustrated in the drawing in which:

Figure 1 is a vertical central cross section through my improved tire cover showing the method of applying the same to the tire;

Figure 2 is a sectional perspective view showing the manner of holding the metallic section to the tire;

Figure 3 is a perspective view illustrating the manner of engaging the fabric section with the metallic section in the manufacture of the cover;

Figure 4 is a rear elevation of a portion of a tire to which my improved cover is applied;

Figure 5 is a cross section through the bead which connects the fabric section with the metallic section.

The metallic section A of the cover is of annular form being provided with a front wall of sufficient width to cover the tire case and wheel rim, and also having a curved flange B for extending part way over the periphery of the tire. This metallic section may be readily formed of pressed sheet metal and is preferably provided at its radially inward edge with a curved flange C and at its peripheral edge with a return bent bead D. At the bottom the flange B is preferably cut away as indicated at E to form a drainage aperture, this also facilitating the engagement of the fabric section with the metallic section as follows: The fabric section F is preferably formed of a waterproofed strip of fabric having one edge thereof corded as shown at G to engage the return bent bead D of the section A. Figure 3 illustrates the manner of engaging the fabric section with the metallic section by inserting the corded edge G into the bead D where the flange B is cut away at E and then drawing it around the full peripheral length of the flange. The bead D is then clinched or closed about the cord and securely fastens the fabric in position. The opposite edge of the strip F is formed with a loop H in which a coil spring I is placed. This spring is of such peripheral length and of such tension that it will draw the edge of the fabric radially inward against the tire and will also serve to center the metallic section A and to hold it in firm contact with the outer wall of the tire.

With the construction as described in use the fabric strip F is preferably drawn back over the flange B of the metallic section A as illustrated in Figure 1 which permits of placing the section A against the tire on the front side thereof. The fabric is then drawn rearward off from the flange B and into the position shown in Figure 2 where the spring I will draw the edge of the fabric into firm contact with the inner wall of the tire. This will also react to draw the metal section A into firm contact with the front wall of the tire and will hold it from displacement or rattling. In case the peripheral diameter of the tire is somewhat less than the flange B of the section A, the fabric section F and spring I will still serve to hold the section A centralized with reference to the tire. If on the other hand the tire is slightly larger in diameter than the flange B the cut away portion E will permit of slightly springing this flange outward so as to engage such a tire.

It will be appreciated that my improved construction is easily manufactured, the metallic section being formed by die pressing and the fabric section being merely a strip having a corded edge and a looped edge, with the spring I engaging the loop. The assembly of these two parts is also quickly and easily performed as above described so that the cost of manufacture is relatively low.

What I claim as my invention is:

1. A tire cover comprising a rigid annular section having a portion for covering the exposed side of the tire and a portion extending partly over the periphery of the tire and a fabric section secured to the edge of the latter portion and complementary thereto, said section being adapted to be turned back over the peripheral portion of said rigid section to permit easy assembly and removal of the cover and a resilient annular tension member secured to the inner edge of said fabric section for retaining both sections in engagement with the tire.

2. A tire cover comprising an annular rigid member having a portion for covering the exposed side of the tire and a portion extending part way over the periphery of the tire, a fabric section attached to the inner edge of said peripheral portion and adapted to be turned back thereover prior to and released after engagement of the cover with the tire and a resilient annular tension member secured to the opposite edge of said fabric section adapted to draw the same into contact with the inner surface of the tire and to retain said rigid section in position.

3. A spare tire cover comprising a rigid section for covering the front and a portion of the outer periphery of the tire and an arcuate clamping portion of flexible material having one edge associated with said rigid section and including resilient contracting means at the free edge thereof, said arcuate portion being folded back over the peripheral portion of the rigid section to permit said rigid section to be moved into tire protecting position, said arcuate clamping portion being of such width as to be readily releasable and movable from the folded back position to a position to the rear of the rigid section, said resilient means upon movement past the rear edge of the rigid section being adapted to contract and engage the rear wall of the tire to hold said rigid section in position.

4. A spare tire cover comprising a rigid section including a portion for covering the front of the tire and an inwardly extending portion for covering the greater part of the periphery of the tire and an arcuate clamping portion of flexible material having one edge associated with the rear edge of the rigid section and including contracting means at the free edge thereof, said arcuate portion being folded back over the inwardly extending portion of the rigid section when said cover is in assembly position to permit the cover to be manually placed on a spare tire, the inwardly extending portion of the rigid section serving to retain the cover on the tire, said folded back portion being of such width as to be readily releasable and movable from the folded back position to a position to the rear of the rigid section, said contracting means being adapted to contact with the rear wall of the tire to hold the cover in tire protecting position.

5. A spare tire cover comprising a rigid section including a portion for covering the front of the tire and an inwardly extending portion for covering the greater part of the periphery of the tire and an arcuate clamping portion of flexible material having one edge associated with the rear edge of the rigid section and including contracting means at the free edge thereof, said arcuate portion being folded back over the inwardly extending portion of the rigid section when said cover is in assembly position to permit the cover to be manually placed on a spare tire, the inwardly extending portion of the rigid section serving to retain the cover on the tire, said folded back portion being of such width as to be readily releasable and movable from the folded back position to a position to the rear of the rigid section, said contracting means being adapted to contact with the rear wall of the tire to hold the cover in tire protecting position and maintain the front portion of the rigid section against the front wall of the tire.

6. A spare tire cover comprising a rigid section including a portion for covering the front of the tire and an inwardly extending portion for covering a part of the periphery of the tire and an arcuate clamping portion of flexible material having one edge associated with the rear edge of the rigid section and including contracting means at the free edge thereof, said arcuate portion being folded back over the inwardly extending portion of the rigid section when said cover is in assembly position to permit the cover to be manually placed on a spare tire, the inwardly extending portion of the rigid section serving to retain the cover on the tire, said folded back portion being of a width substantially equal to the inwardly extending portion of the rigid section whereby to be readily releasable and movable from the folded back position to a position to the rear of the rigid section, said contracting means being adapted to contact with the rear wall of the tire to hold the cover in tire protecting position.

7. A spare tire cover comprising a rigid section including a portion for covering the front of the tire and an inwardly extending portion for covering a part of the periphery of the tire and an arcuate clamping portion of flexible material having one edge associated with the rear edge of the rigid section and including contracting means at the free edge thereof, said arcuate portion being folded back over the inwardly extending portion of the rigid section when said cover is in assembly position to permit the cover to be manually placed on a spare tire, the inwardly extending portion of the rigid section serving to retain the cover on the tire, said folded back portion having a width less than the width of the inwardly extending portion of the rigid section whereby to be readily releasable and movable from the folded back position to a position to the rear of the rigid section, said contracting means being adapted to contact with the rear wall of the tire to hold the cover in tire protecting position.

CARL C. KREBS.